US006950811B2

(12) United States Patent
Ali

(10) Patent No.: US 6,950,811 B2
(45) Date of Patent: Sep. 27, 2005

(54) METHOD AND APPARATUS FOR OPTIMIZING VIDEO PROCESSING SYSTEM DESIGN USING A PROBABILISTIC METHOD TO FAST DIRECT LOCAL SEARCH

(75) Inventor: Walid Ali, Montrose, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 315 days.

(21) Appl. No.: 10/196,046

(22) Filed: Jul. 15, 2002

(65) Prior Publication Data

US 2004/0010479 A1 Jan. 15, 2004

(51) Int. Cl.[7] ............................ G06F 15/18; G06N 3/00; G06N 3/12
(52) U.S. Cl. .............................. 706/13; 706/14; 706/12
(58) Field of Search .............................. 706/13, 14, 12; 703/2

(56) References Cited

U.S. PATENT DOCUMENTS

| | | | |
|---|---|---|---|
| 6,188,381 B1 | 2/2001 | van der Wal | 345/112 |
| 2002/0138457 A1 * | 9/2002 | Jin et al. | 706/26 |
| 2002/0169563 A1 * | 11/2002 | de Carvalho Ferreira | 702/20 |
| 2003/0032010 A1 * | 2/2003 | Selifonov et al. | 435/6 |
| 2003/0055614 A1 * | 3/2003 | Pelikan et al. | 703/2 |

FOREIGN PATENT DOCUMENTS

| | | | |
|---|---|---|---|
| EP | 941180333 | 11/1994 | H04N/5/765 |
| EP | 991256688 | 6/2001 | H04N/17/02 |
| GB | 2359643 A | 8/2001 | G06F/17/60 |
| WO | 0111458 A1 | 2/2001 | G06F/3/14 |
| WO | 0137553 A1 | 5/2001 | H04N/5/262 |
| WO | 02093480 | 11/2002 | G06T/1/00 |

OTHER PUBLICATIONS

"Embracing Premature Convergence: The Hypergamous Parallel Genetic Algorithm" by Isaac K. Evans, IEEE World Congress on Computational Intelligence, 1998—XP010288761.

* cited by examiner

Primary Examiner—Joseph P. Hirl
(74) Attorney, Agent, or Firm—Edward W. Goodman

(57) ABSTRACT

A hybrid method and apparatus for obtaining an optimum video processing system design includes the steps of: (a) using genetic algorithms to find video sample candidates having a best chromosome for performance and associated fitness values; and (b) using a probabilistic method to find local optima based on the fitness values from step (a) in a local search scheme. The results of the probabilistic method are then reinserted into genetic algorithms to increase speed and reduce the processing requirements if only genetic algorithms were used. The results obtained from the genetic algorithms using the local optima found by the probabilistic method may then be output to one of a video processing system and video module. Hardware for an apparatus and system to perform same includes a video source input, a processor, a genetic algorithm module, a probabilistic search module, a memory and at least one video module.

10 Claims, 3 Drawing Sheets

| CHROMOSOME | | | | | | | GENERATION | FITNESS |
|---|---|---|---|---|---|---|---|---|
| $BIT_1$ | $BIT_2$ | $BIT_3$ | ... | $BIT_l$ | ... | $BIT_K$ | | |
| 1 | 0 | 0 | ... | 1 | ... | 1 | t | $f_0$ |
| 1 | 0 | 1 | ... | 0 | ... | 0 | t+1 | $f_1$ |
| 0 | 0 | 1 | ... | 1 | ... | 1 | t+2 | $f_2$ |
| | | | ... | ... | ... | | | |
| 1 | 1 | 1 | ... | 0 | ... | 1 | t+n | $f_n$ |

FIG. 2

METHOD AND APPARATUS FOR OPTIMIZING VIDEO PROCESSING SYSTEM DESIGN USING A PROBABILISTIC METHOD TO FAST DIRECT LOCAL SEARCH

BACKGROUND OF THE INVENTION

1. Field of the Invention

The present invention is related to optimizing a video processing system design, and methods for obtaining such systems. More particularly, the present invention is related to the design of such systems using a probabilistic method.

2. Description of the Related Art

Video processing systems are composed of a large number of video modules that interact together to reach the best picture quality. There is a great degree of difficulty deciding on the best setting for each module. In fact, there is no formal method for validating the correctness of the module settings. Rather, system designers used ad-hoc techniques and their own experience to tune the video modules. As more recent hardware paradigms permit many different architectural structures, there are more possibilities for connectivity. Thus, there is more freedom to decide on the best connectivity scheme.

A method has been proposed for solving the problem regarding video module settings in a formal manner by using genetic algorithms (GAs) as an evolutionary framework for optimizing video processing systems. Genetic algorithms, which can be used to evaluate video quality, that may or may not be part of a feedback system in which video quality is enhanced has been previously proposed by the present inventor in U.S. application Ser. No. 09/817,891 entitled "A General Scheme for Diffusing Different Implementations of a Number of Video Algorithms in an Optimum Way for Best Objective Video Quality (Filed Mar. 27, 2001) and U.S. application Ser. No. 09/734,823 entitled "A Scalable Dynamic Metric for Automatic Evaluation of Video Quality" (Filed Dec. 12, 2000), the contents of both application are hereby incorporated by reference as background material.

Genetic Algorithms are based on the concept that diversity of the gene pool helps to ensure a population's survival under changing circumstances. GA procedures are iterative and maintain a population of candidate solutions in a form of chromosome strings. An initial population can be selected randomly or heuristically. For each generation, the candidates are evaluated and subsequently assigned a fitness value, and selected for reproduction in a subsequent generation based on fitness values.

Accordingly, GA's are computationally greedy methods requiring substantial processing power capabilities. As a result there have been attempts to use hybrid search engines of GA's and less-complicated search engines.

However, there is still a need in the art to improve video processing system design beyond its current state.

SUMMARY OF THE INVENTION

The present invention provides a process and apparatus for providing video processing system design wherein there is a modeling of different states of at which the system tuning may be used as a search space. As the search space is too large to explore exhaustively, an aspect of the present invention includes using a probabilistic method to gear a local search method toward the local optimum faster, based on the probability pattern of the best samples in the local neighborhood of the search space. The best samples from the probability pattern are subsequently re-inserted to Genetic Algorithms for crossover and mutation. Thus, a new method that is a hybridization to extract the best features of GA's (e.g. not getting stuck at the local optima) and a probabilistic local search (finding the best local optima rapidly). Thus, the present invention finds the local optimum faster than if only Genetic Algorithms were used.

BRIEF DESCRIPTION OF THE DRAWINGS

FIG. 2 is a table that illustrates recent best sample chromosomes.

DETAILED DESCRIPTION OF THE INVENTION

It is to be understood by persons of ordinary skill in the art that the use of GAs introduces variability on the solutions while preserving the "goodness" (aka fitness) of the best solution attained in a population by crossover and mutation. A solution is represented by a binary pattern referred to as a chromosome. For example, if a problem's solution is represented by a chromosome consisting of k bits. As the GAs improve by testing a whole set of samples in one generation (population), the population of sample can then be sorted by performance.

Figure 1:
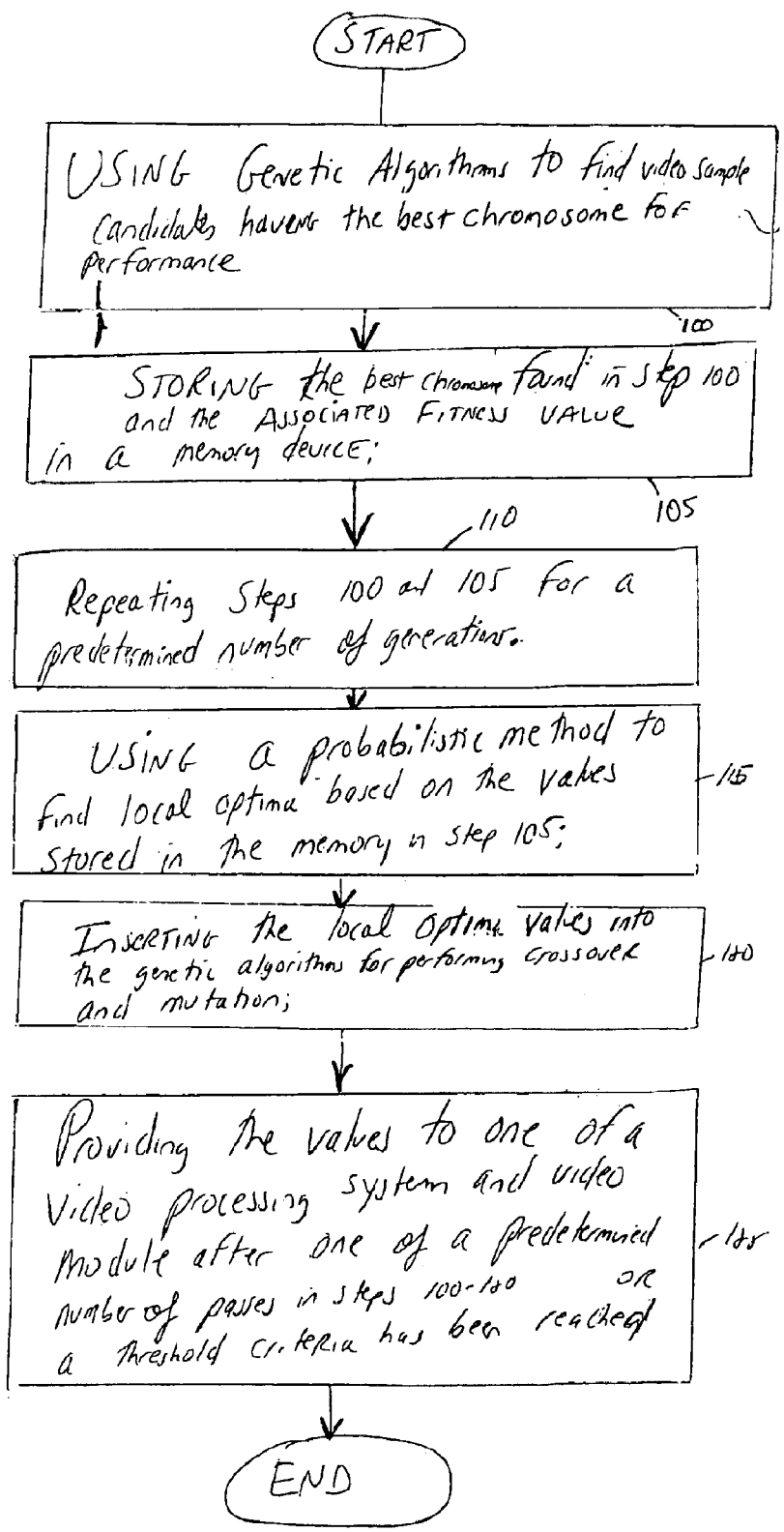
FIG. 1 is a flowchart providing an overview of a method according to the present invention.

FIGS. 1A and 1B are a flowchart illustrating an overview of the present invention.

At step 100, genetic algorithms are used to find video sample candidates having the best chromosome for performance.

At step 105, the best chromosome is stored in a memory device. The associated fitness value f is also stored for each chromosome.

Step 110 includes repeating steps 100 and 105 until either a predetermined number of passes, generations and/or fitness score criteria has been reached. Assuming that the first pass is at time=t, and the next generation is t+1, the threshold may be t+n and have fitness values $f_{t+0}$, $f_{t+1}$ to $f_{t+n}$.

FIG. 2 shows a table illustrating one way that the information from steps 100 to 110 could be represented. The chromosome for each generation (t) is from k bits in length. The associated fitness value is also illustrated.

At step 115, there is the use of a probabilistic method to find local optima based on the values stored in memory from step 105. This step is type of hybridization away from the more "greedy" computing methods of GAs used in the first steps to a faster local direct search to obtain the best local optima rapidly. A vector is constructed using the assumption that GA's evolve toward the best solution:

$$\overline{P}_{t+n} = [P_l(t+n)], \text{ where } (0 < l < k+1, l \text{ is an integer}) \quad \text{eqn. (1)}$$

$$P_l(t+n) = \frac{\sum_{t}^{t+n} BIT_l \times f_1}{\sum_{1}^{t+n} f_1}; \qquad \text{eqn. (2)}$$

The vector $\overline{P}_{t+n}$ is a vector of probability, whose dimension is k, each dimension representative of a corresponding bit 1. Each vector dimension provides the probability of its bit 1 being equal to one in the local best chromosome. The probability of any bit l. i.e., $BIT_l$ (0<l<k+1, l is an integer) being equal to one at time t+n is $P_l$(t+n). The latter is defined as the normalized sum of the products of this bit's value (1 or 0) and its respective chromosome's fitness, the summation occurring over the past n generations. In effect, $P_l$(t+n) is a weighted average, according to fitness, of this bit's values over the generations.

Thus, at time t+n, we have the probability vector $P_{t+n}$, and we can derive a binary chromosome according to the probability of any bit (bit l, 0<l<k+1, l is an integer) of the chromosome.

At step 120, there is an insertion of local optima values from a probabilistic method as discussed above into the genetic algorithms for performing crossover and mutation.

Finally, at step 125, the values from the process are provided to one of a video processing system and/or video module so as to optimize design.

Figure 3:
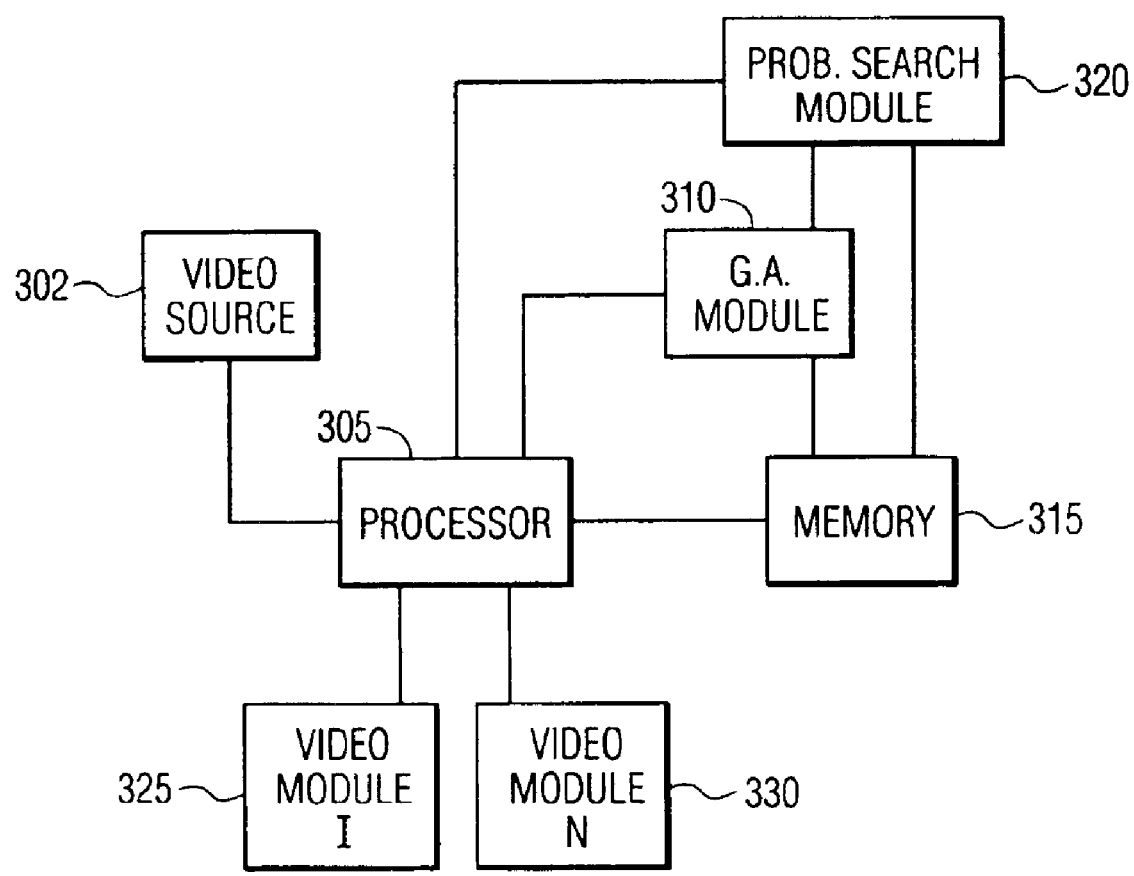
FIG. 3 illustrates a block diagram of one embodiment of an apparatus according to the present invention.

FIG. 3 illustrates an apparatus and/or system for obtaining the optimum video processing design according to the present invention. A video source 302 is received by processor 305. Genetic Algorithms can be performed by Genetic Algorithm module 310, and local optima can be provided by the probabilistic search module 320. It is also possible that the G.A. module 310 and the probabilistic search module are a single module. The chromosomes from t to t+n are stored in memory 315, as is the fitness values f. After the probabilistic search module 320 provides local optima, these values may be provided back to G.A. module 310. After further processing (i.e. crossover and mutation), video modules 325, 330 can receive optimized parameters. It should be understood by persons of ordinary skill in the art that the number of video modules can be more or less than two.

Various modifications can be made by a person of ordinary skill in the art that do not depart from the spirit of the invention, or the scope of the appended claims.

What is claimed is:

1. A method for obtaining an optimum video processing system design, comprising the steps of:
    (a) performing a hybrid method comprising:
        (i) using genetic algorithms to find video sample candidates having a best chromosome for performance and associated fitness values; and
        (ii) selecting said associated fitness values for use in a probabilistic method to find local optima in a local search scheme;
    (b) providing results obtained in step (a) (ii) for further processing by genetic algorithms;
    (c) providing results obtained in step (b) to one of a video processing system and video module.

2. A method for obtaining an optimum video processing system design, comprising the steps of:
    (a) using genetic algorithms to find video sample candidates having a best chromosome for performance;
    (b) storing the best chromosome found in step (a) and an associated fitness value in a memory;
    (c) repeating steps (a) and (b) to obtain a plurality of chromosomes for one of (i)a predetermined number of times and (ii) a predetermined fitness value;
    (d) using the associated fitness values stored in memory in step (b) in a probabilistic method to find local optima;
    (e) inserting local optima values into the memory; and
    (f) performing genetic algorithms using the local optima values obtained in step (e).

3. The method according to claim 2, further comprising providing the values obtained in step (e) to one of a video module and video processing module.

4. A method for obtaining an optimum video processing system design, comprising the steps of:
    (a) using genetic algorithms to find video sample candidates having a best chromosome for performance;
    (b) storing the best chromosome found in step (a) and an associated fitness value in a memory;
    (c) repeating steps (a) and (b) to obtain a plurality of chromosomes for one of (i)a predetermined number of times and (ii) a predetermined fitness value;
    (d) using a probabilistic method to find local optima based on the fitness values stored in memory in step (b);
    (e) inserting local optima values into the memory and providing the inserted values to one of a video module and video processing module; and
    (f) performing genetic algorithms using the local optima values obtained in step (e), wherein the probabilistic method includes building a probability vector according to the following equations:

$$\overline{P}_{t+n} = [P_l(t+n)],$$

where (0<l<K+1, l is an integer) and $$P_l(t+n) = \frac{\sum_{t}^{t+n} BIT_l \times f_1}{\sum_{t}^{t+n} f_l};$$

wherein the vector $\overline{P}_{t+n}$ is a vector of probability, whose dimension is k, and indicates the probability of any bit l being equal to one in the local best chromosome, and the probability of any bit l (0<l<k+1, l is an integer) equaling one at time t+n is $P_l$ (t+n), the latter being defined as a normalized, weighted sum, for bit l, of the product of bit l and the respective chromosome's fitness, the summation being performed over the past n generations.

5. The method according to claim 4, wherein the probability vector includes values of a predetermined number of recent video processing solutions having the highest fitness values.

6. A device for obtaining an optimum video processing system design, comprising:
    a video source input;
    a processor communicating with the video source input, said processor comprising output means for providing optimum parameters to at least one video module;
    a genetic algorithm module and a probabilistic search module for conducting respective genetic algorithms and probabilistic searches;

a memory communicating with the processor and genetic algorithm module and probabilistic search module for storing respective values of chromosomes and associated fitness values;

wherein the probabilistic search module retrieves data from the memory stored by the genetic algorithm module and performs searches to obtain local optima, results of which are stored in the memory for further processing by the genetic algorithm modules, said probabilistic search module performs a search according to the following equations:

$$\overline{P}_{t+n} = [P_l(t+n)],$$

where ($0<l<K+1$, l is an integer) and $$P_l(t+n) = \frac{\sum_{t}^{t+n} BIT_l \times f_1}{\sum_{t}^{t+n} f_l}$$

wherein vector $\overline{P}_{t+n}$ is a vector of probability, whose dimension is k, and indicates the probability of any bit l being equal to one in the local best chromosome, and the probability of any bit l ($0<l<k+1$, l is an integer) equaling one at time t+n is $P_l$ (t+n), the latter being defined as a normalized, weighted sum, for bit l, of the product of bit l and the respective chromosome's fitness, the summation being performed over the past n generations.

7. A system for obtaining optimum video processing design, comprising:

means for performing a hybrid method for optimization by:
 (i) using genetic algorithms to find video sample candidates from a video source having a best chromosome for performance and associated fitness values; and
 (ii) selecting said associated fitness values for use in a probabilistic method to find local optima in a local search scheme;

means for providing results obtained in step (a) (ii) for further processing by genetic algorithms; and means for providing results obtained in step (b) to one of a video processing system and video module.

8. A system method for obtaining an optimum video processing system design, comprising:

genetic algorithms means for finding video sample candidates having a best chromosome for performance;

storage means for storing the best chromosome found by the genetic algorithm means, and for storing an associated fitness value in a memory;

means for utilizing the fitness values stored in said storage means in a probabilistic search to find local optima;

means for inserting local optima values into the memory; and said genetic algorithms means using the local optima values obtained by the means for providing a probabilistic search.

9. The system according to claim 8, wherein said genetic algorithm means provides the values obtained using the local optima values obtained by the probabilistic search means to one of a video module and video processing module.

10. The method according to claim 8, wherein the means for providing a probabilistic search builds a probability vector according to the following equations:

$$\overline{P}_{t+n} = [P_l(t+n)],$$

where ($0<l<K+1$, l is an integer) and $$P_l(t+n) = \frac{\sum_{t}^{t+n} BIT_l \times f_1}{\sum_{t}^{t+n} f_l}$$

wherein the vector $\overline{P}_{t+n}$ is a vector of probability, whose dimension is k, and indicates the probability of any bit l being equal to one in the local best chromosome, and the probability of any bit l ($0<l<k+1$, l is an integer) equaling one at time t+n is $P_l$ (t+n), the latter being defined as a normalized, weighted sum, for bit l, of the product of bit l and the respective chromosome's fitness, the summation being performed over the past n generations.

* * * * *